Feb. 5, 1957 L. E. MUELLER 2,780,287
SHEAR
Filed July 1, 1954 2 Sheets-Sheet 1

INVENTOR.
LOUIS E. MUELLER
BY Whittemore,
Hulbert & Belknap
ATTORNEYS

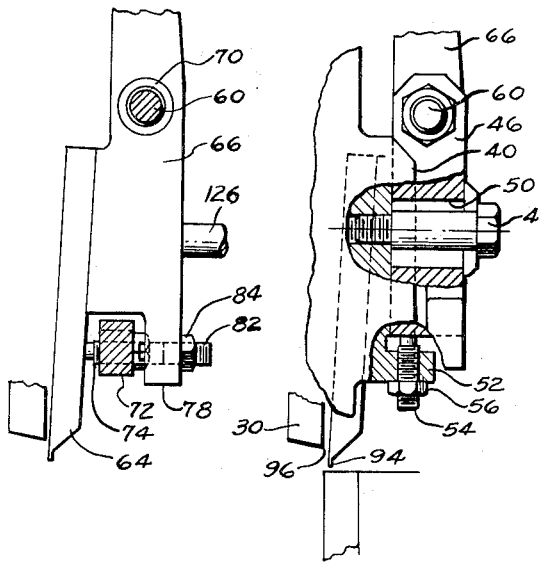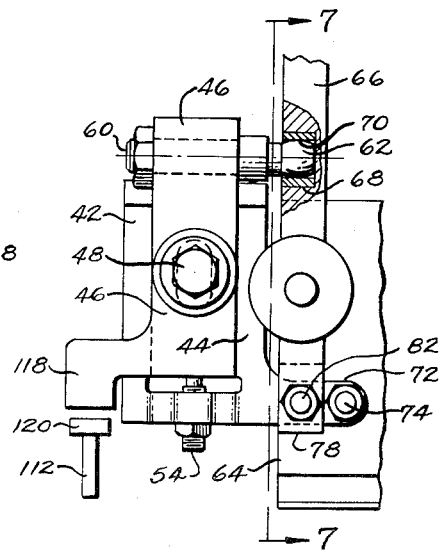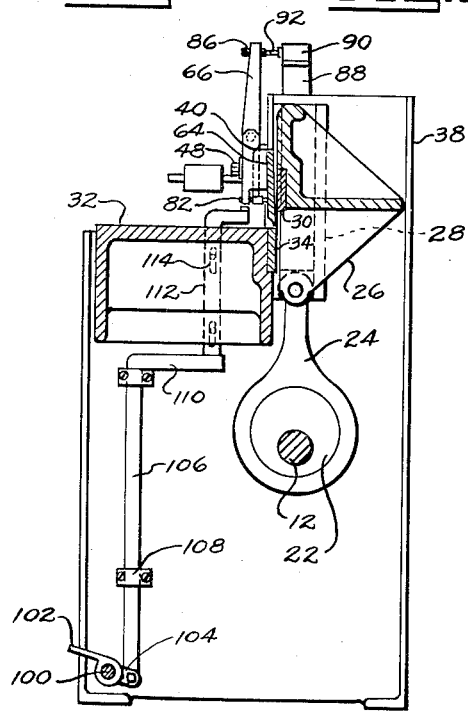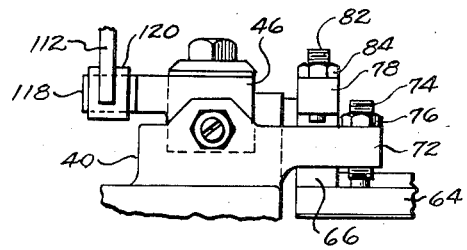

United States Patent Office 2,780,287
Patented Feb. 5, 1957

2,780,287
SHEAR

Louis E. Mueller, Detroit, Mich., assignor to The Rapid Electrotype Company, Cincinnati, Ohio, a corporation of Ohio Application July 1, 1954, Serial No. 440,713

9 Claims. (Cl. 164—47)

The present invention relates to apparatus for shearing sheet material.

It is an object of the present invention to provide a shearing apparatus including means operable by movement of a work sheet to actuate the shearer.

It is a further object of the present invention to provide shearing apparatus including a shearing blade and a gauge plate having a feeler portion closely spaced from the plane of movement of the shearing edge of the blade adapted to be engaged by a portion of a work sheet to initiate shearing operation of the blade.

More specifically, it is an object of the present invention to provide shearing apparatus comprising a bed or table over which sheet material is movable, a blade movable in shearing relation to the rear edge of said bed, a gauge plate including a feeler portion located directly in front of the shearing blade, the shearing blade having an idle position spaced upwardly from the plane of the bed to permit movement of a portion of the work sheet therebeneath, the feeler portion of the gauge plate having a lower edge spaced above the bed a lesser distance than the lower edge of the blade to provide for movement therebeneath of relatively thin portions of sheet material but to engage relatively thick portions thereof so as to trim relatively thin portions away from the thicker portions thereof.

Other objects and features of the invention will become apparent as the description proceeds, especially when taken in conjunction with the accompanying drawings, wherein:

Figure 3 is a side view of the shearing apparatus with parts in section on line 3—3, Figure 1.

Figure 4 is an enlarged fragmentary front elevational view of the mounting means for the gauge plate with parts broken away.

Figure 5 is a fragmentary side elevational view of the structure shown in Figure 4, with parts broken away.

Figure 6 is a fragmentary bottom plan view of the structure shown in Figure 4.

Figure 7 is a section on the line 7—7, Figure 4.

Figures 1, 2:
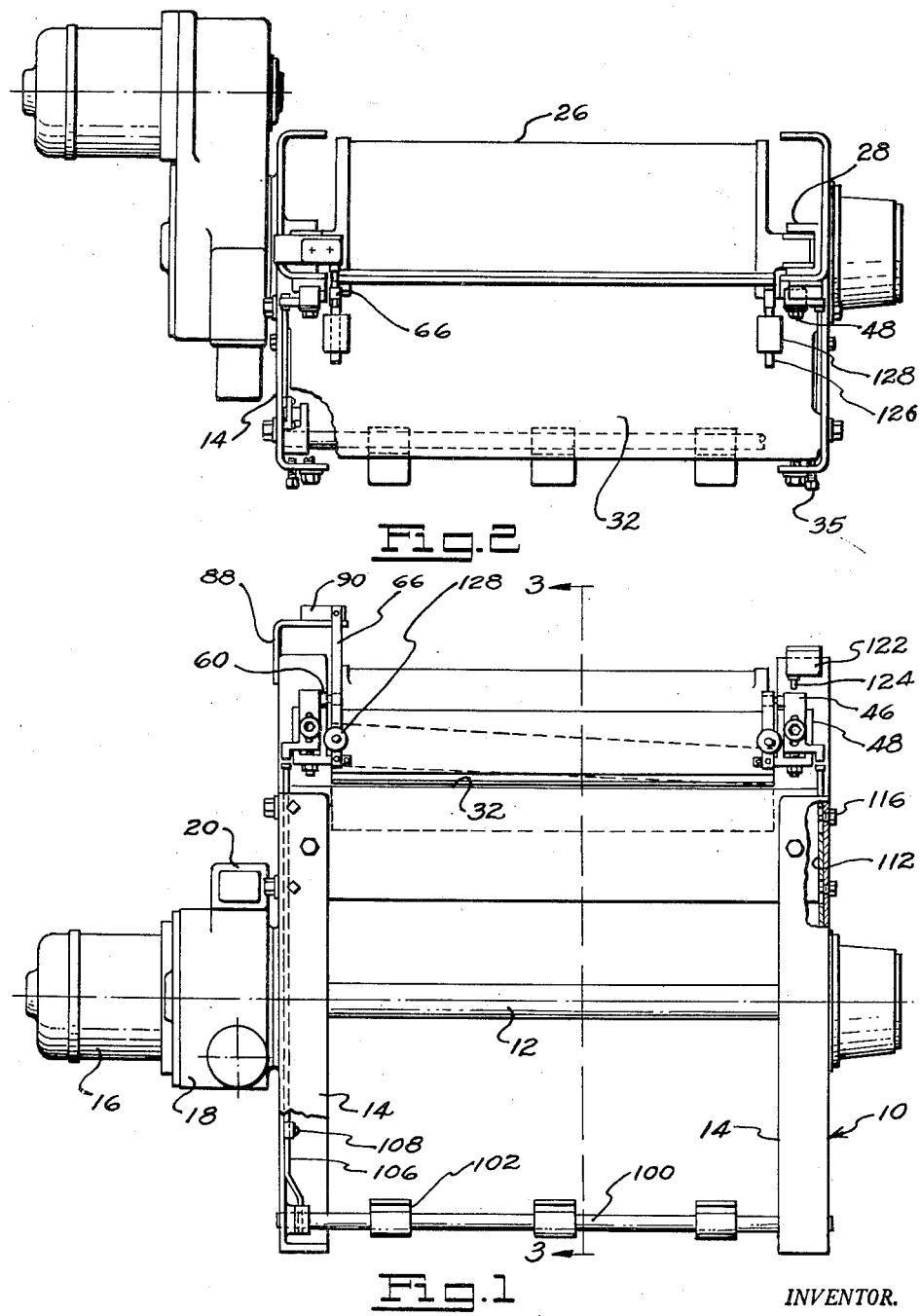
Figure 1 is a front elevational view of the shearing apparatus with parts in section.
Figure 2 is a plan view of the shearing apparatus shown in Figure 1, with parts broken away.

Referring now to the figures, the apparatus comprises a main frame 10 having a drive shaft 12 extending between side portions 14, the drive shaft being operatively connected to a motor 16 through suitable reducing gears and a clutch contained in a housing 18. Associated with the clutch is a solenoid 20. The detailed construction of the motor, reducing gears, clutch and solenoid does not enter into the present invention and this equipment is readily available on the open market. The operation however, is such that upon actuation of the solenoid, the clutch is engaged to effect a complete rotation of the drive shaft 12 upon completion of which the clutch is disengaged.

Operatively connected to the drive shaft 12 is an eccentric 22 having associated therewith a pitman 24 operatively connected to a blade support arch 26 which is mounted for vertical reciprocation in a guideway indicated generally at 28. From the foregoing it will be apparent that each single rotation of the drive shaft 12 results in downward and thence upward movement of a shearing blade 30 carried by the arch or support 26.

The frame has supported thereon a bed or table 32 over which the work material is slidable. At its rear edge the table 32 is preferably provided with a stationary plate 34 against which the shearing blade 30 operates in shearing relation. Bed 32 is adjustable, and adjusting screws 35 are provided for this purpose.

The frame 10 extends upwardly at the rear of the bed 32 to form a column 38. At the forward side of the column are provided forwardly extending guide portions 40 including spaced flanges 42 and 44 between which are vertically slidable carrier members 46. The outer members 46 are retained between the flanges 42 and 44 by means of an assembly screw 48 threaded into a tapped recess in the column. The screws 48 extend through vertically elongated openings 50 to mount the carrier 46 for vertical movement. Beneath the guide portions 40 there are provided forwardly extending lugs 52 threaded to receive adjustable stop screws 54 which are locked in adjusted position by lock nuts 56. It will be apparent that the carriers 46 are movable upwardly away from the stop screws 54 but that their lower position is accurately determined by the adjustment of such stop screws.

As best seen in Figure 4, the carriers 46 are provided with pins 60 having rounded ends 62. A gauge plate 64 has rigidly secured to its ends upwardly extending support members 66 which are recessed as indicated at 68 and the recesses are provided with hardened rings 70 into which the rounded portions 62 of the pins 60 extend. By this arrangement the gauge plate 64 is mounted for swinging movement about a horizontal axis determined by the axes of the pins 60.

Adjustable means are provided for limiting rocking movement of the gauge plate 64 and this means comprises a projection 72 on the guide portion 40 which extends at one side of the gauge plate 64. The projection 72 is provided with a tapped hole receiving an adjustable stop screw 74 which is locked in position by a lock nut 76. Extending downward from the support 66 is a lug 78 tapped to receive a second adjustable stop screw 82 which is adapted to be locked in adjusted position by a lock nut 84. The adjusting screw 82 is positioned to engage one side of the projection 72 to thereby limit swinging movement of the gauge plate 64.

As best seen in Figure 3, one of the upwardly extending support members 66 carries at its upper end an adjustable screw 86 and the column 38 has attached thereto a bracket 88 carrying a limit switch 90 having a button 92 engageable by the screw 86. Inasmuch as the support member 66 is relatively long, it will be appreciated that a sensitive and accurate control of the limit switch 90 is thereby afforded.

The shearing apparatus, while capable of a wide variety of uses, was particularly designed for the purpose of shearing away relatively thin portions of printing plates to trim such plates. Accordingly, it is desired to provide the gauge plate so that it is operable by relatively thick portions of such plates as they approach the plane of movement of the cutting edge of the shearing blade. For this purpose the gauge plate as best illustrated in Figure 5, is provided with a very thin feeler portion 94 which it will be observed is parallel to and closely adjacent to the shearing edge 96 of the blade 30. Conveniently, the feeler portion of the gauge may be provided by relatively thin sheet material permanently secured to a relatively thick body portion and extending downwardly slightly below the edge thereof. This provides adequate support for the feeler portion which is desirably as thin as possible to permit trimming of the plate as close as possible to the raised printing portions thereof.

In normal operation the shearing operation is provided by the operator moving the relatively thin edge portions of the printing plate across the table or bed toward the blade. The relatively thin portions of the printing plate pass beneath the lower edge of the feeler portion 94 of the gauge plate. When, however, raised printing portions of the plate engage the feeler portion 94 the gauge plate is rocked about the axis of the supporting pins 62 and limit switch 90 is actuated. In the illustrated embodiment of the invention limit switch 90 is thus actuated by movement of the arm 66 and screw 68 to the left as seen in Figure 3. In some cases it is desirable to sever a relatively thick plate intermediate the edges thereof, and for this purpose means are provided for elevating the gauge into inoperative position and at the same time disabling the gauge from actuating the power means including the motor, clutch, etc. This means comprises a shaft 100 near the base of the machine having one or more foot pedals 102 thereon. Connected to the arms 104 rigidly connected to the shaft 100 are vertically movable rods 106 supported in guides 108 and having horizontally extending end portions 110 and upwardly extending slide members 112 having elongated openings 114 therein receiving screws 116, thereby providing for vertical sliding movement of the members 112.

The carriers 46, as best seen in Figure 4, include offset portions 118 and the upper ends of members 112 are provided with heads 120 to engage beneath the offset portions 118. Accordingly, when pressure is applied to the foot pedals 102 carriers 46 are moved vertically thus elevating the gauge plate 64 out of operative position.

Means are provided to prevent actuation of the shearing blade when the gauge plate has been moved to upper position. This means comprises a limit switch 122 located directly above one of the carriers 46 in position to be engaged thereby. The limit switch 122 is associated with the limit switch 90 so that when the button 124 of limit switch 122 is raised, actuation of the button 92 of limit switch 90 is ineffective to initiate operation of the shearing blade. This permits moving relatively elevated portions of a printing plate beneath the shearing blade without actuation thereof. When the blade has passed over an elevated portion of the printing plate and is over a relatively thin portion thereof, the pedal 102 may be released, permitting the gauge plate 64 to move downwardly for actuation by the next succeeding elevated portion of the printing plate. It will also be understood that if an elevated portion of the printing plate is beneath the blade when the gauge plate is lowered into contact therewith, actuation of the shear may be effected by slight rearward movement of the plate if desired, or limit switch 122 may be so adjusted as to prevent actuation of the shear until the gauge plate 64 moves to its full downward position.

Means are provided for determining the force required to move the gauge plate 64 to actuate the shearing mechanism and this means includes arms 126 carrying adjustable balance weights 128 thereon.

It will be appreciated that sufficient force may be required to move the gauge plate to actuate the power mechanism for moving the shearing blade so that the operator may insert a thin edge portion of a printing plate beneath the gauge plate until an elevated portion thereof engages the feeler portion 94 of the gauge plate. The operator may sense the contact between the elevated portion of the printing plate with the gauge plate and may thereafter turn the printing plate until a second elevated portion thereof engages the gauge plate, at which time the printing plate as a whole may be moved rearwardly thus effecting a shearing stroke which will cut the thin edge portion of the printing plate along a straight line substantially adjacent to two raised portions thereof.

Accurate adjustment of the height of the lower edge of the feeler portion 94 of the gauge plate may of course be accomplished by adjusting the screws 54.

The drawings and the foregoing specification constitute a description of the improved shear in such full, clear, concise and exact terms as to enable any person skilled in the art to practice the invention, the scope of which is indicated by the appended claims.

What I claim as my invention is:

1. Shearing apparatus for shearing away relatively thin edge portions of a printing plate or the like, comprising a work supporting table having a shearing blade spaced rearwardly from the front of the table to provide a work supporting surface in front of said blade, means mounting said blade for shearing movement toward and away from said table, power means operably connected to said blade for reciprocating said blade in shearing strokes and terminating such strokes with said blade elevated above said table to provide for movement of sheet material across the work supporting surface of said table and beneath said blade, a movable control member spaced above said table directly in front of said blade, said control member having a lower edge closer to said table than said blade when said blade is in elevated idle position to provide for passage of thin portions of sheet material from front to rear beneath both said blade and member and actuation of said blade by engagement by a thicker portion of sheet material with said member.

2. Apparatus as defined in claim 1, said member comprising an elongated bar having a thin vertical portion extending in closely spaced parallel relation to said blade.

3. Apparatus as defined in claim 1 which comprises means for raising said member to a position to clear relatively thick sheet portions.

4. A shearing machine comprising a frame having a flat work supporting bed thereon and a column extending upwardly at the rear of said bed, a vertically reciprocable shearing blade on said column having a shearing edge movable in shearing relation across the rear of said bed, power means for moving said blade in a downward shearing stroke and return to an idle position spaced above the plane of said bed, and control means for said power means comprising a gauge plate having a feeler portion in front of and closely adjacent the shearing edge of said blade, said feeler portion being spaced above said bed and movable by a work sheet to actuate said power means.

5. A shearing machine as defined in claim 4 in which said gauge plate is carried by said column for swinging movement toward and away from said blade.

6. A shearing machine as defined in claim 5, means mounting said gauge plate on said column for vertical movement, operator manipulable means for shifting said gauge plate vertically between lower operable and upper inoperable positions, and means actuated by upward movement of said gauge plate to render said plate ineffective to actuate said power means.

7. A shearing machine as defined in claim 4 comprising a carrier mounted for vertical movement on said column, said gauge plate being pivoted to said carrier, and means under the control of an operator to raise and lower said carrier.

8. A shearing machine as defined in claim 7 which comprises means operable by rocking of said gauge plate relative to said carrier for actuating said power means.

9. A shearing machine as defined in claim 8 which comprises means operable by upward movement of said carrier to render rocking of said gauge plate ineffective to actuate said power means.

References Cited in the file of this patent

UNITED STATES PATENTS

| | | |
|---|---|---|
| 1,193,631 | Thomas | Aug. 8, 1916 |
| 1,385,369 | Ferrier | July 26, 1921 |
| 1,499,537 | Kurkowski | July 1, 1924 |
| 1,534,257 | Brogan | Apr. 21, 1925 |
| 2,371,358 | Sekella | Mar. 13, 1945 |
| 2,589,347 | Demerath | Mar. 18, 1952 |